No. 682,183. Patented Sept. 10, 1901.
H. ETHERIDGE.
GLOBE TESTER.
(Application filed May 9, 1901.)
(No Model.)
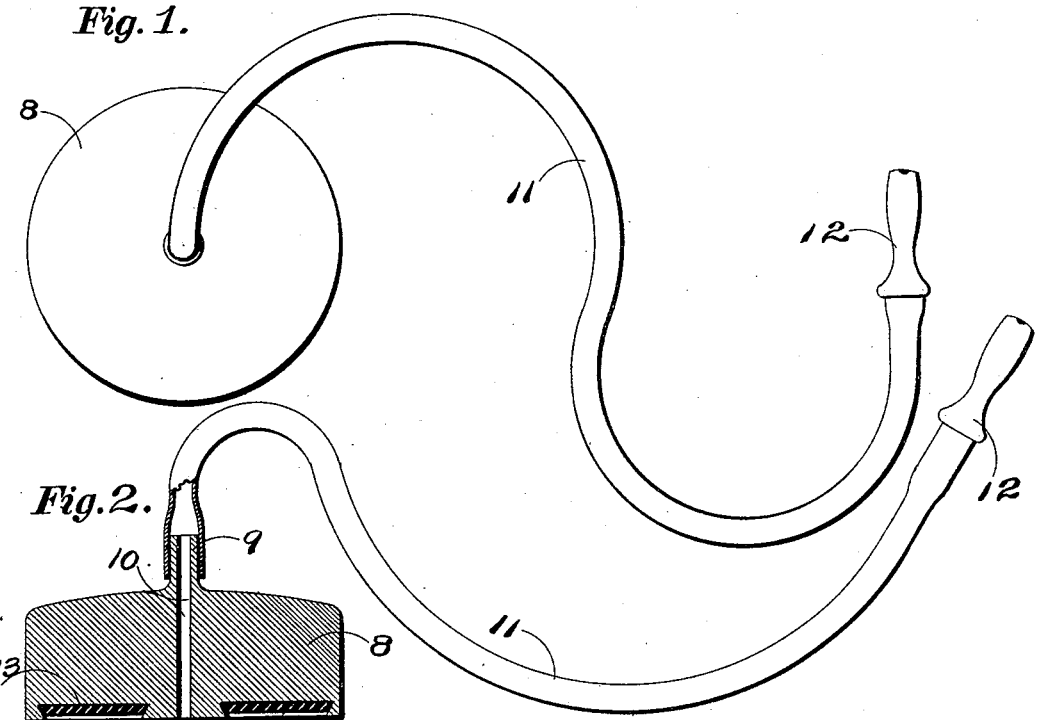
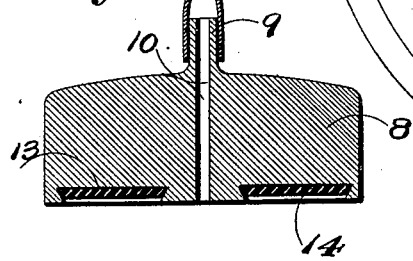
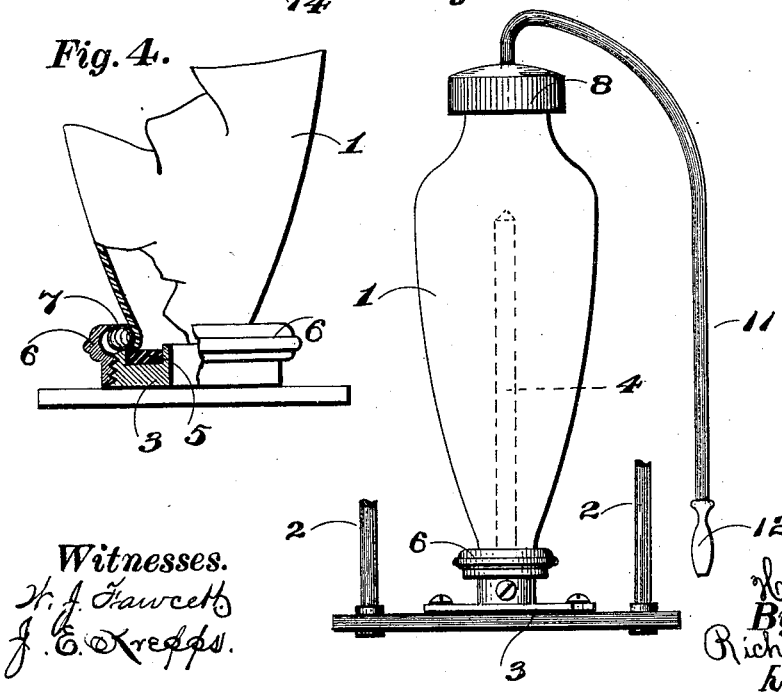
Witnesses.
W. J. Fawcett
J. E. Krepps
Inventor.
Harry Etheridge.
By-
Richard S. Harrison
his Attorney.
THE NORRIS PETERS CO., PHOTO-LITHO., WASHINGTON, D. C.

UNITED STATES PATENT OFFICE.

HARRY ETHERIDGE, OF McKEESPORT, PENNSYLVANIA.

GLOBE-TESTER.

SPECIFICATION forming part of Letters Patent No. 682,183, dated September 10, 1901.

Application filed May 9, 1901. Serial No. 59,377. (No model.)

*To all whom it may concern:*

Be it known that I, HARRY ETHERIDGE, a subject of the King of Great Britain, residing at McKeesport, in the county of Allegheny and State of Pennsylvania, have invented certain new and useful Improvements in Globe-Testers; and I do hereby declare the following to be a full, clear, and exact description thereof, reference being had to the accompanying drawings, which form a part of this specification.

This invention relates to new and useful improvements in globe-testers.

The invention particularly relates to testing inner globes as used for inclosing the carbons in arc-lights.

The object of my invention is to provide a simple, practical, and comparatively inexpensive device by which the connections or joints of the globe, globe-holder, and carbon-holder may be tested for air-leakage.

In the accompanying drawings I have illustrated a device by which my object may be attained, in which—

Figure 1 is a plan view of the testing device. Fig. 2 is a side elevation of the same, partly in section. Fig. 3 is a side elevation of the device, on a reduced scale, showing the device in testing position upon a globe. Fig. 4 is an enlarged side elevation of a portion of a globe and holder, being partly shown in section.

In said drawings the numeral 1 designates one of several forms of globes as used with arc-lamps.

The numeral 2 designates portions of the lamp-frame, having a base-piece 3 thereon to engage a carbon 4 and said globe. Globes of this class are clamped within the base-piece to retain it in position and to exclude air, and the usual manner in which this is accomplished is to seat the globe upon a pliable washer 5, which is fitted into a recess in the said base-piece. The outer periphery of this base-piece is threaded to receive a collar 6. This collar carries a contractible spiral spring 7, which engages the lip formed about the globe-base, thereby firmly securing or clamping said globe upon the pliable seat. The above-described lamp parts being old in the art are made use of in this case for the purpose of illustrating the use of my lamp-globe tester.

The lamp-globe-testing device consists of a weight or body 8, having a stem 9 projecting from the top thereof and through which is formed an opening 10. To the said stem is attached a rubber hose 11, of suitable length, terminating in a mouthpiece 12. The face of the weight or body is provided with an annular dovetailed groove 13, into which is fitted or secured an elastic or yielding washer 14, which is preferably seated at a depth beyond the surface of the weight. After the globe and carbon are placed in position in the holder and made secure the device is placed on top of said globe, as illustrated at Fig. 3, and in such position that the rubber washer 13 will engage the globe-top. Pressure is then applied through the mouthpiece into the globe. If the joints are all tight, the air will be compressed in the globe, indicating that the joints are tight and in safe condition for use. If, however, a compression cannot be obtained, it is evident that a leak exists, requiring a new washer or globe, as the case may be. It is also evident that if compression is obtained a slight back pressure can be felt on the tongue through the small orifice in the mouthpiece, which also indicates that the joints are perfect and in condition for use. It is also evident that a vacuum condition may be formed by this same device by sucking the air out of the globe through the mouthpiece and indication of tight joints given with the well-known characteristics of a vacuum condition and which will be made manifest by the tongue being held fast to the orifice in the mouthpiece.

The value of this invention is measured by the ability of the carbon-setter to know when the globe-joints are tight, thus excluding air therefrom, and consequently increasing the life of the lamp, practice proving that twenty per cent. additional life is obtained from circuits in which this device is employed.

It is found in practice where this device is not in use that many lamps burn out much quicker than others, and upon examination it is found that the joints are imperfect, permitting air to enter the globes, and consequently a greater consumption of carbon takes place in such lamps than exists in lamps in which air is practically shut off.

The weight of this globe-tester is made to suit a safe tightness of the joints in the globes, and which has been found in practice to be safe and convenient at or about five (5) pounds.

Modifications as to detail construction of this device may be made without departing from the principles involved.

Having thus fully shown and described my invention, what I claim as new, and desire to secure by Letters Patent, is—

1. A testing device for globes, comprising a detached body which by its own weight is adapted to seal an open end of a globe upon which it freely rests, and means whereby air may be conducted into or exhausted from said globe through said body to detect leakage or fracture in said globe.

2. A testing device for globes, comprising a detached body which by its own weight is adapted to seal an open end of a globe upon which it freely rests, means whereby air may be conducted into or exhausted from said globe through said body to detect leakage or fracture in said globe, and a yielding surface on said body where contact is made with the said globe end.

3. A testing device for globes, comprising a detached body which by its own weight is adapted to seal an open end of a globe upon which it rests, and an elastic conductor extending from said body whereby air may be forced into or exhausted from said globe through said body to detect leakage or fracture therein.

4. A testing device for globes, comprising a detached body which by its own weight is adapted to seal an open end of a globe upon which it freely rests, an elastic conductor extending from said body whereby air may be forced into or exhausted from said globe through said body to detect leakage or fracture therein, and a yielding surface on said body where contact is made with the said globe end.

5. A testing device for globes, comprising a detached body which by its own weight is adapted to seal an open end of a globe upon which it freely rests, an elastic conductor extending from said body which terminates in a mouthpiece whereby air may be forced into or exhausted from said globe through said body to detect leakage or fracture therein, and a yielding surface on said body where contact is made with the said globe end.

In testimony whereof I have hereunto affixed my signature in the presence of two subscribing witnesses.

HARRY ETHERIDGE.

Witnesses:
EDWIN WINTERS,
GEO. B. HERWICK.